May 23, 1950

P. T. HAURY 2,509,058

FRICTION DEVICE FOR OPERATING KNOBS
IN ADJUSTABLE APPARATUS

Filed Dec. 12, 1946

INVENTOR
P. T. HAURY
BY J. MacDonald
ATTORNEY

Patented May 23, 1950

2,509,058

UNITED STATES PATENT OFFICE 2,509,058

FRICTION DEVICE FOR OPERATING KNOBS IN ADJUSTABLE APPARATUS

Paul T. Haury, New Brunswick, N. J., assignor to Bell Telephone Laboratories, Incorporated, New York, N. Y., a corporation of New York Application December 12, 1946, Serial No. 715,770

4 Claims. (Cl. 201—48)

This invention relates to clutch and brake mechanisms and more specifically to a brake mechanism which is particularly well adapted for use, for example, in potentiometer devices and the like for holding the manually operable knob and the wiper actuated thereby in each adjusted position on the coil of the potentiometer.

The object of the present invention is the provision of a clutch and brake mechanism of the type above-referred to which will be of simple construction, efficient and convenient to operate.

Figure 1:
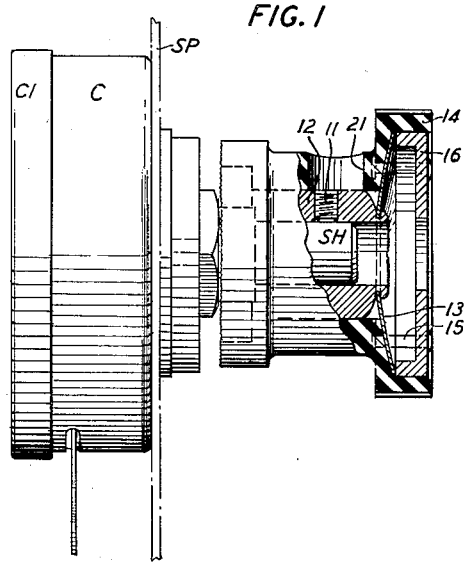
Fig. 1 is an assembly view shown with a number of operating parts partially in central section, the elements of the clutch being shown in the disengaged position.

Referring to the drawing the potentiometer meter to which the friction brake of this invention is peculiarly well adapted for use may consist, for example, of a cylindrical casing C having a cover C1, a coil C2 and a wiper W, secured to one end of a shaft SH, this shaft having a reduced portion H fitted for rotary movement into the hub portion H1 formed or secured to the casing C centrally thereof.

Shaft SH is held against longitudinal movement in the hub H1 by the shoulder portion SP formed by the reduced portion H of the shaft and a collar D held on the end of reduced portion H of shaft SH collectively with the wiper W by a screw SC engaging a similarly screw-threaded hole into the reduced end portion H of shaft SH.

Figure 2:
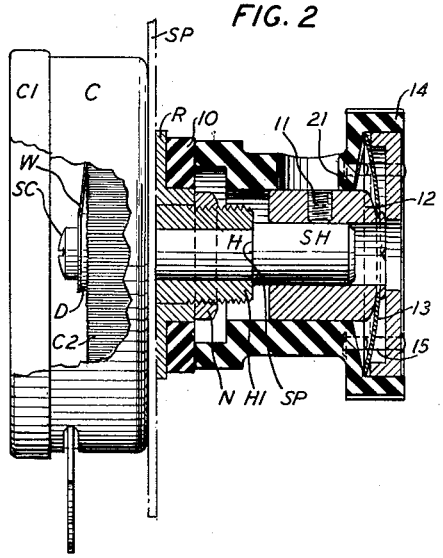
Fig. 2 is a longitudinal sectional view shown with the elements of the clutch in the engaged position, the casing for the potentiometer being shown with portions broken away.
Figure 3:
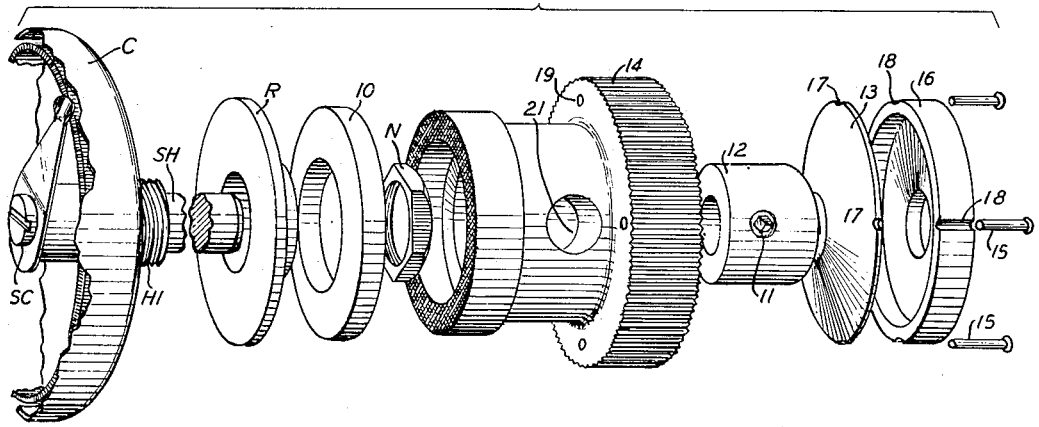
Fig. 3 is an exploded view.

The hub portion H1 of casing C as shown in Figs. 2 and 3 is provided at the periphery with a screw thread for receiving a nut N serving in cooperation with a ring R and the potentiometer casing C to form a clamping arrangement for securing the potentiometer assembly to a supporting plate SP.

The clamping ring R is formed with a hub portion best seen in Fig. 2 for receiving a ring 10 constructed of a material having a high coefficient of friction such as rubber forming an element of a friction brake which will be hereinafter described in detail.

Figure 4:
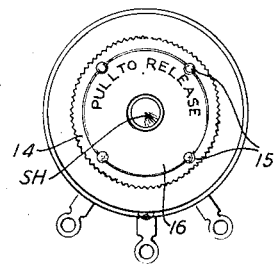
Fig. 4 is an end view reduced.

On the enlarged portion of shaft SH is secured as by a set screw 11, a bushing 12 having a reduced portion at one end for rigidly securing a washer or ring-shaped member 13 of resilient material formed with a concavo-convex cross-section normally flexed in the position shown in Fig. 1. The disc 13 at its outer peripheral edge is fitted in a counterbore formed in a manually operable knob 14 mounted for free longitudinal or sliding movement on the bushing 12 which thus serves as a guide for holding the knob 14 in concentric relation to shaft SH. The spring disc 13 has its peripheral edge clamped against a shoulder portion formed by the counterbore in the knob 14 and a ridge formed with a disc-shaped member 16, while the disc 13 and the disc-shaped member 16 are provided with a plurality of equally-spaced semi-circular notches 17 and 18, respectively, best seen in Fig. 3, engaged by a corresponding number of screws 15 best seen in Figs. 3 and 4. These screws engage similarly screw-threaded holes 19 in the knob 14 for operatively connecting the knob 14 to the disc 13 and thereby to the potentiometer shaft SH through the bushing 12, the latter being secured as above mentioned to the potentiometer shaft SH by set screw 11 shown in Figs. 1, 2 and 3. This set screw 11 is accessible through an opening 21 drilled radially into the hub portion of knob 14.

The end of the hub portion of knob 14 which is disposed adjacent the friction ring 10 is formed of a diameter substantially that of ring 10, and its face surface is knurled so as to grip the friction ring 10 when forced against it by the tension of spring washer 13 upon the flexing of this washer from the position shown in Fig. 1 to the position shown in Fig. 2 in a manner which will be hereinafter described in detail.

In a typical operation of the clutch and brake mechanism of this invention, considering the spring ring 13 flexed in the position shown in Fig. 1, the manual rotation of knob 14 is effective to rotate the potentiometer shaft and the wiper W carried thereby for adjustment relative to coil C2 through the rotation of spring ring 13 keyed to the knob 14, by screws 15 and the disc 13 in turn secured to the bushing 12 secured on the shaft SH by the set screw 11. A manual longitudinal movement imparted to knob 14 on bushing 12 is effective to flex the spring ring 13 from the position shown in Fig. 1 to a point past its so-called dead center when the spring ring is caused to flex to the position shown in Fig. 2 by the medium of its own resilience for engaging the knurled face of knob 14 which forms one element of the brake with the friction washer 10 which is the other brake member for frictionally holding the knob and thereby the wiper W of the potentiometer in the adjusted position on the coil C2.

When a longitudinal movement of the knob in the opposite direction shifts it from the position shown in Fig. 2 to a point where the spring ring passes its dead center, the resiliency of the spring ring is effective to further move and then hold the knob and the friction elements of the brake in the disengaged position shown in Fig. 1. Following this clutch action of the mechanism to disengage the brake members, the knob 14 can again be manually rotated to rotate the potentiometer shaft. The movement of the knob as effected by the resiliency of the spring ring is limited as shown in Fig. 1 in its released direction by the abutment of the spring ring against the conical surface formed by the counterbore in the knob.

What is claimed is:

1. In a control device for the operation of two elements adjustably movable relative to each other, a first brake member coupled to one of said elements, a rotatable shaft coupled to the other of said elements, a knob supported by said shaft for slidable motion parallel to the axis of said shaft, a spring ring of concavo-convex cross-section operatively coupling said knob to said shaft for rotation therewith, a second brake member formed with said knob and coupled thereby to the other of said elements, said knob being rotatable for adjustably positioning said elements relative to each other and movable parallel to the axis of said shaft for engaging the first brake member with the second brake member to hold said elements in adjusted position relative to each other.

2. In a control device for the operation of two elements adjustably movable relative to each other, a shaft coupled to one of the elements, a spring ring coupled adjacent its central portion to said shaft, a manually operable knob coupled to the peripheral portion of said spring ring for rotating said shaft and said one element relative to the other element and mounted for slidable motion parallel to the axis of said shaft, and a brake device coupled to said two elements operable upon the movement of said knob axially relative to said shaft.

3. In a control device for the operation of an element relative to a stationary element, a shaft supporting the movable element, a bushing keyed on said shaft, a manually operable knob mounted for sliding movement on said bushing, a spring ring having a concavo-convex cross-section secured to said bushing, means for operatively connecting said spring ring to said knob for rotating said shaft and the movable element relative to the stationary element, and a brake device operable upon the sliding movement of said knob on said bushing for holding the movable element in position relative to the stationary element.

4. In a control device for a potentiometer having a casing, a hub portion for the casing, a shaft rotatably mounted in the hub of the casing, a coil housed in said casing, a wiper carried by said shaft for movement in adjusted position on said coil, a bushing secured on said shaft, a knob mounted for sliding movement on said bushing, a stationary friction clutch element mounted on the hub portion of the casing, a clutch element formed with said knob for engaging the first-mentioned clutch element and detent means operatively connected to said bushing and to said knob and operable upon the longitudinal movement of said knob for engaging said clutch elements for holding the wiper in adjusted position on the coil.

PAUL T. HAURY.

REFERENCES CITED

The following references are of record in the file of this patent:

UNITED STATES PATENTS

| Number | Name | Date |
| --- | --- | --- |
| 2,207,462 | Kurtz | July 9, 1940 |
| 2,252,015 | Machler | Aug. 12, 1941 |
| 2,427,310 | Schumaker | Sept. 9, 1947 |